April 4, 1950      W. A. MILLER      2,503,060
OBJECT DETECTION SYSTEM
Filed March 16, 1944      2 Sheets-Sheet 2
Fig. 2a.
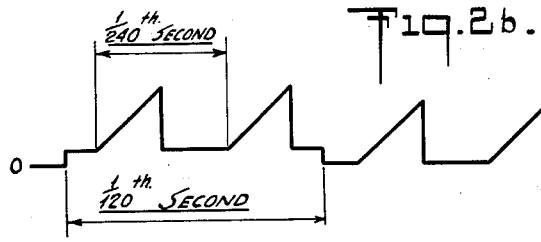
Fig. 2b.
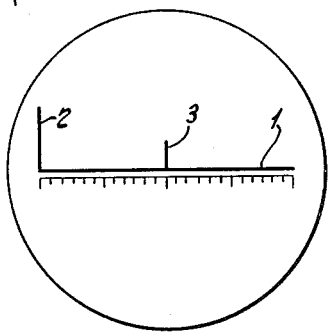
Fig. 3a.
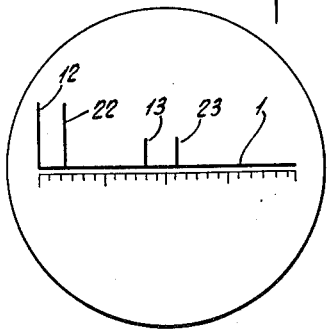
Fig. 3b.
Fig. 4a.
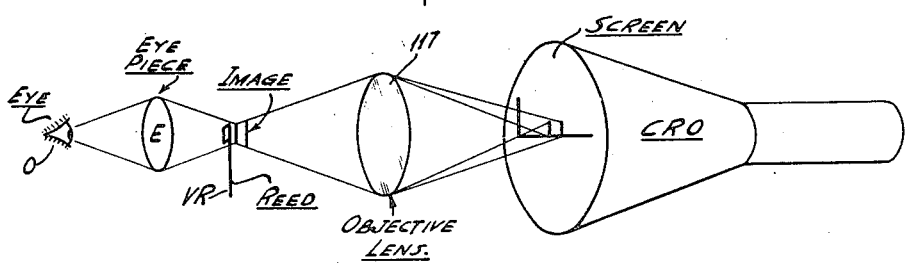
Fig. 4b.
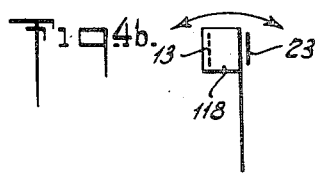
INVENTOR
WILLIAM A. MILLER.
BY H.S. Grover
ATTORNEY Patented Apr. 4, 1950

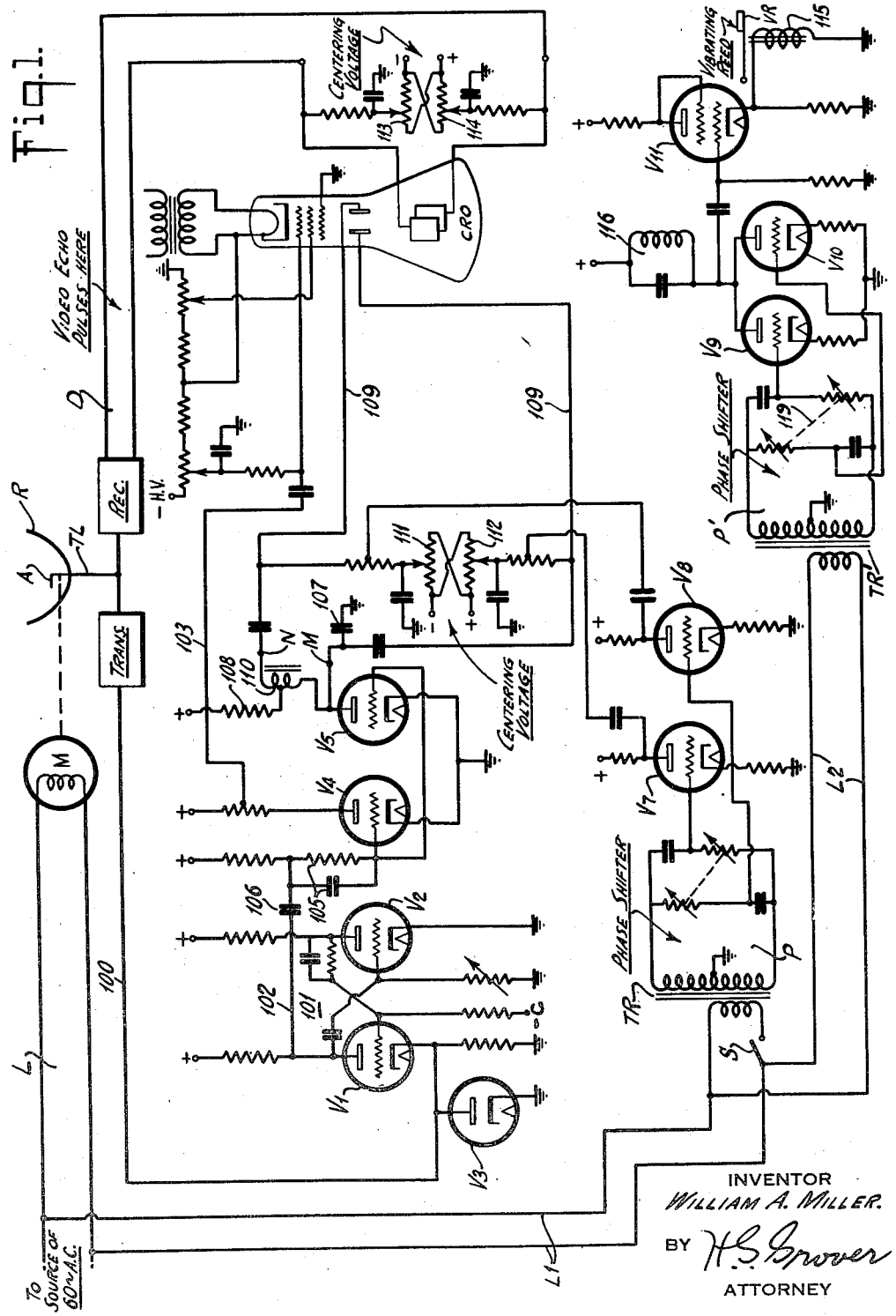

2,503,060

UNITED STATES PATENT OFFICE 2,503,060

OBJECT DETECTION SYSTEM

William A. Miller, Port Jefferson, N. Y., assignor to Radio Corporation of America, a corporation of Delaware Application March 16, 1944, Serial No. 526,745

11 Claims. (Cl. 343—11)

This invention relates to radio object detection and location systems, and particularly to an improved object detection and location system utilizing pulses of radio frequency energy for determining the exact location of an object. The invention is particularly useful as a radio locator of airplanes and ships, and has both military and commercial applications.

Object detection and location system (sometimes referred to as a radio locator) have been proposed and are described in my copending applications Serial No. 473,801, filed January 28, 1943, and Serial No. 501,050, filed September 13, 1943, now U. S. Patents 2,422,361 and 2,470,939 respectively and also a copending application of Nils E. Lindenblad, Serial No. 454,661, filed August 13, 1942, now U. S. Patent 2,500,552 issued March 14, 1950, wherein a lobe switching or conical scanning system is employed. Such a lobe switching system involves causing a directive antenna system to sequentially assume four different patterns or lobes corresponding to the four quadrants of a circle. This is done by causing a small deflection of a radio beam at regular intervals through the four quadrants of a circle which is perpendicularly located to the mean axis of the beam, by means of a spinning radiating element positioned off the center or focus of a parabolic reflector, or by spinning a deflecting element off the focus of the parabolic reflector. If a spinning radiating element is employed, it may be rotated around one end as an axis, or, preferably, the entire radiating element rotated around a circle without changing its polarization, as by nutation. This type of lobe switching antenna, when employed for radio locating purposes, is able to produce beam deflections at regular intervals when driven by a motor, and is freely movable in all directions under the manual control of the operators for scanning purposes and for pointing the antenna directly on the object or target to be detected. This type of object detection and locating system employs a transmitter for transmitting periodically repeated ultra short radio wave pulses of extremely short duration. A receiver is used to receive the echo pulses which are reflected back from the object to be detected.

In the systems described in the foregoing copending applications, supra, the spinning antenna is driven by a motor at about sixty revolutions per second. At this speed of rotation, the pulses of ultra high frequency energy are radiated 240 times per second corresponding to a pulse for each quadrant position of each revolution of the antenna. The up and down beam firing positions of the radiating element are used to determine the elevation or vertical position of the object to be detected and located, while the right and left beam firing positions of the radiating element are used to determine the azimuthal or horizontal position of the same object. The radiation patterns or lobes of the beam will, of course, be different for different quadrants of the circle as the radiating element rotates. The antenna system is so designed that the ears of the radiation patterns, or lobes, overlap in the up and down beam firing positions and also overlap in the right and left beam firing positions. Since the time interval between radiated pulses is quite long compared to the time of each pulse, it will be understood that a pulse reflected by a remote object to be detected will be received at the receiver located adjacent the transmitter during the same quadrant of rotation in which the original pulse is radiated. As an illustration the pulse radiated during each quadrant position of each revolution of the antenna may have a duration of the order of one or two microseconds.

If the pulses which are reflected from a remote object (sometimes referred to as echo pulses) are of equal intensity and if they were radiated in the up and down positions of the rotating radiating element, they will be received during the same up and down positions, and because the radiated pulses were of equal intensity, it follows that the horizontal plane of the antenna system is pointed at the object. If the reflected or echo pulses received during the right and left positions of the rotating radiating element are also of equal intensity, it follows that the vertical plane of the antenna system is also pointed at the object. Under these conditions, the object to be detected is in a direct line with the focus of the antenna. If now, the parabolic reflector of the antenna is made of widely spaced wires in mesh formation, and the object is within visual distance, the illumination of a searchlight placed directly behind the reflector will illuminate the object. It will be apparent that although the vertical plane referred to above is always vertical regardless of the orientation of the light, the horizontal plane is actually only "horizontal" when the antenna and reflector are in such position that the beam would be projected tangent to the earth's surface.

If the received pulses reflected from the object are of unequal intensity, it is an indication that the antenna system is not pointed directly at the object, but to one side of the object.

The echo or reflected pulses which are received have heretofore, as exemplified in the systems described in the foregoing copending applications, been viewed on a pair of oscilloscopes, of which one indicates the pulses received during the up and down positions of the rotating radiating element, and the other of which indicates the pulses received during the right and left positions of the rotating radiating element. Circuits are employed to distinguish between the echo pulses viewed on one oscilloscope during the up and down lobe positions and also between the echo pulses viewed on the other oscilloscope during the right and left lobe positions.

In the operation of the above mentioned object detection systems, it is necessary to employ different operators for viewing the different oscilloscopes simultaneously.

The same general principles thus far described for object detection and location, insofar as the lobe switching or conical scanning feature is concerned, are also utilized in the practice of the present invention. However, the object detection system of the present invention is simpler and less complicated than those hereinabove referred to. More specifically, the present invention employs fewer circuit elements and only one cathode ray tube to determine elevation and azimuthal positions and also the range or distance of the object to be detected, thus requiring only a single attendant to operate the system.

The following is a more detailed description of the invention, in conjunction with drawings, wherein:

Fig. 1 schematically illustrates the object detection system of the present invention;

Fig. 2a graphically illustrates the saw-tooth wave form produced by a sweep generator circuit in the system of the invention;

Fig. 2b graphically illustrates the change or modification in the wave form of Fig. 2a, as available for use by the cathode ray oscilloscope in order to distinguish the different lobe positions;

Figs. 3a and 3b illustrate the appearance of the oscilloscope screen during two conditions of operation, while an object is being detected;

Fig. 4a illustrates the optical apparatus for viewing the oscilloscope screen; and Fig. 4b illustrates in more detail the size of the light tab on the vibrating reed in relation to the amplitude of motion and the markings on the oscilloscope screen.

Referring to Fig. 1 in more detail, there is shown a pulse transmitter Trans. of a type known in the art for producing ultra short wavelength pulses of very short duration compared to the time intervals between them. As an example, the transmitter may produce oscillations of ten centimeter wavelength in pluses of one microsecond each. The transmitter is coupled via a line TL to a directive antenna comprising a rotatable radiating element A positioned off the center of a parabolic reflector R. This radiating element is driven by a synchronous motor M at a speed of sixty revolutions per second. Motor M is energized over leads L from a source of sixty cycles alternating current supply. The motor M is located quite close to the antenna. The transmitter system is so designed that during each quadrant of the circle of travel of the radiating element A the transmitter will deliver a single pulse of energy to the antenna, as a result of which there will be 240 pulses radiated per second.

Each pulse is preferably of the order of one microsecond duration. The transmitter may or may not be linked to motor M, but in any event is synchronized in operation with respect to the source of sixty cycle alternating current.

The receiver Rec. which receives the echo pulse reflected from the object to be detected is also connected to the antenna system, as shown. The output of the receiver consists of unidirectional pulses of energy, which are passed on over leads D to the vertical deflecting plates of a cathode ray oscilloscope CRO.

Each time the transmitter produces a pulse of energy for radiation by the antenna, a portion of this pulse is passed on to the receiver Rec., which in turn produces a corresponding output pulse in leads D. This pulse will appear at the beginning of the sweep on the oscilloscope screen and will be displaced on the screen from the echo pulse which appears later, due to the time it takes for a pulse from the antenna to reach the object or target to be detected and return.

Another portion of the output pulse energy from the transmitter Trans. is also fed to lead 100 which extends to a trigger circuit 101 for the purpose of starting the saw-tooth generator or sweep circuit. The pulses appearing on lead 100 are of relatively negative polarity and serve as input pulses to trip the trigger circuit 101.

Trigger circuit 101 comprises a pair of triode vacuum tubes V1 and V2 whose grids and anodes are interconnected regeneratively to produce a circuit having one degree of electrical stability. Normally, in the operation of the trigger circuit, tube V1 is non-conductive and biased to cut-off by means of source —C. Tube V2 is normally in a conductive state and passes current because its grid is maintained at substantially zero bias. This condition wherein tube V1 is normally non-conductive and tube V2 normally conductive is called the stable state of the trigger circuit. In the active or unstable state, however, the current passing conditions of the tubes V1 and V2 are reversed from that just described. After an interval of time in the active state, depending in part upon the time constants of the circuit, the trigger will restore itself to the stable state. The diode V3 serves to quickly dissipate the negative input pulse applied to line 100 which is used to initiate the active period and thus obviate any effect the duration of the input pulse might have had on the trigger circuit during its active state. A rectangular wave output pulse of negative direction is obtainable from the anode of tube V1.

The negative output pulse appearing on the anode of tube V1 is fed via lead 102 to the grids of triode vacuum tubes V4 and V5. Tubes V4 and V5 are normally conductive in the absence of pulses from trigger 101. Negative pulses appearing on lead 102 bias the tubes V4 and V5 to cut-off for the duration of the pulses, thus enabling the tubes to supply pulses of positive polarity from their anode circuits. It will thus be seen that tubes V4 and V5 are controlled from the output of trigger circuit 101. The cathodes of these tubes V4 and V5 are directly connected together and to ground. The grids of these two tubes are also connected together and to one terminal of the condenser-resistor combination 105, the other terminal of which is connected to condenser 106 in circuit with the output of the trigger circuit.

The positive pulse taken from the anode circuit of tube V4 by way of lead 103 serves as an intensification pulse for the cathode ray oscilloscope CRO. Normally, the first grid of tube CRO is biased negatively to prevent the electron stream from reaching the fluorescent screen. The application of a positive pulse to lead 103 overcomes this negative bias on the first grid of tube CRO and permits the electron stream to reach the screen and thus become visible to the eye.

The anode of tube V5 is connected to a condenser 107. In effect, condenser 107 and tube V5 comprise a saw-tooth generator or sweep circuit. Normally, in the absence of an output pulse from trigger 101 and while tube V5 is conducting, there is a low impedance path between the terminals of condenser 107 through the tube V5. The application of a negative pulse to the grid of tube V5 from the output of the trigger circuit will, however, render the tube V5 non-conducting and thus permit a charge to be built up on condenser 107 through resistor 108. The charge on condenser 107 will build up until the end of the rectangular output pulse from the trigger circuit which will occur when the trigger circuit returns to its stable state, at which time tube V5 will against pass current and discharge the condenser 107 through the low impedance space path of the tube V5 in its current passing condition. A saw-tooth wave form having a frequency of 240 cycles per second corresponding in frequency to the transmitted pulses is thus built up across the condenser 107 and is applied over leads 109 to the horizontal deflection plates of the cathode ray oscilloscope CRO. By connecting an inductance coil 110 in the anode circuit of tube 105 and connecting resistor 108 to the midpoint thereof, and by a proper selection of the values of 107, 108 and 110, I am able to generate a push-pull saw-tooth voltage wave (available at terminals M and N and hence in leads 109) of sufficient linearity to be used as the sweep voltage for scanning the tube CRO. The voltage at one terminal M of coil 110 is always of opposite instantaneous polarity to that at the other terminal N of this coil. The appearance of this saw-tooth voltage wave is generally like the graphical representation of Fig. 2a.

In order to distinguish between the echo pulses received during the up and down antenna lobe positions, and also to distinguish between the pulses received during the right and left antenna lobe positions, it is necessary to displace on the screen the pulses received in the up and down antenna lobe positions relative to each other, and also to displace on the screen the pulses received in the right and left antenna lobe positions. This is achieved by modifying the sweep voltage during either the up or down lobe positions, and also in either the right and left lobe positions, in the manner illustrated in Fig. 2b. An inspection of Fig. 2b will show that two consecutive sweep saw-tooth wave forms are displaced with respect to the two preceding ones. The apparatus for accomplishing this displacement comprises a phase shifter P in combination with vacuum tubes V7 and V8. The phase shifter is supplied via transformer TR with sixty cycle alternating current from leads L1 connected to the same source which drives motor M. This alternating current is supplied to the transformer TR through a switch S. The two parallel connected branches of the phase shifter P each include a variable resistor and a condenser in series, the resistors of which are unicontrolled. Each branch feeds a grid of one of the tubes V7, V8. The inputs of tubes V7 and V8 are at 180° phase relation so that when one of these tubes is going positive the other tube will be going negative. Stated in another way, one tube V7 or V8 may be going toward the "on" direction while the other tube V8 or V7 is going toward the "off" direction, until one tube is "on" and the other tube is "off." These tubes V7 and V8 are biased in such a way that they act as clipper-amplifiers and supply approximately square waves of opposite polarity (50% mark and 60 cycles) of proper timing and polarity so as to displace two consecutive sweep saw-tooth wave forms with respect to the two preceding ones. The anodes of the tubes V7 and V8 are connected to the centering voltage resistors 111, 112 and the connections from these anodes and from the terminals M and N of coil 110 so arranged that when N goes negative the square wave from tube V8 will be in the negative direction, and when M goes positive the square wave from tube V7 will be in the positive direction.

At this time, it should be noted that each pair of deflection plates for the cathode ray tube CRO has coupled thereto a centering voltage circuit composed of a pair of resistors or potentiometers having adjustable taps connected to the leads extending to the deflection plates. The centering resistors for the horizontal deflection plates are labeled 111 and 112, while the centering resistors for the vertical deflection plates are labeled 113 and 114.

The oscilloscope CRO comprises a cathode ray device having a cathode, a multiplicity of control electrodes, a voltage divider circuit for supplying suitable voltages to the grids, horizontal and vertical beam deflection plates and a fluorescent screen. The control electrodes control the brightness and focus of the cathode ray spot on the screen. The horizontal deflection plates have impressed thereon the sweep or saw-tooth voltage appearing on leads 109. The vertical deflection plates have impressed thereon the output from the receiver Rec. The screen is designed to have such a phosphor characteristic that it is intermediate between the low and medium persistence types. Putting it in other words, the screen has a fast decay and a high luminosity characteristic.

In order to properly view the screen of the oscilloscope so as to make the desired distinctions between the echo pulses received in the different lobe positions, there are provided the following circuit elements: A vibrating reed VR energized from a coil 115, a driving circuit for the coil 115 comprising a phase shifter P', a frequency multiplier circuit V9, V10, and an amplifier V11. The phase shifter P' is fed from the 60 cycle alternating current source through transformer TR' and leads L2. Vacuum tubes V9 and V10 have their inputs phase shifted 180° by virtue of the connections from their respective grids to the phase shifter P'. The anodes of the tubes V9 and V10 are connected together and to one terminal of the parallel tuned circuit 116. The tubes V9 and V10 thus constitute a frequency multiplier which multiplies the 60 cycle sweep frequency by two. The 120 cycle frequency appearing in tuned circuit 116 is impressed on vacuum tube amplifier V11 which in turn impresses current of 120 cycles upon coil 115 driving the reed VR.

As shown in Figs. 4a and 4b, reed VR has a small opaque light tab 118 on it which is arranged to be at the image point of an objective lens 117 which gathers light from the screen of the oscilloscope CRO. The optical arrangements are such that the magnification is enough less than one so that the reed in its excursion will intercept the rays from first one and then the other of the two displaced vertical marks on the screen corresponding to the different echo signals reflected from the object being detected and received by Rec. The eyepiece lens E magnifies the image to normal size for observation by the operator at point O. By proper control of the phase shifter P', it is possible to allow only those vertical marks on the oscilloscope screen which correspond to echo signals received during the up and down, or right and left lobe positions to be seen. This control is effected by means of the shaft 119 linking together the variable resistors of the two parallel connected branches in unicontrol fashion. This unicontrol action can be in the form of a switch or push button, if so desired.

Fig. 3a illustrates the appearance on the screen of the transmitted and received pulses when an object is being detected during the condition of operation when switch S is open (that is, without sweep displacement). The horizontal line 1 on the screen represents the sweep. In practice, the space below this horizontal line is provided with index markings along its length representing the range or distance of the apparatus from the object. The first vertical line 2 appears at the start of the sweep and corresponds to the pulse transmitted from the transmitter. This pulse, as described above, is not only radiated from the antenna but is also passed on to the Rec. and also used to start the sweep through trigger circuit 101 and tube V5. If desired, apparatus may be employed for preventing the transmitted pulse from directly reaching the receiver Rec., so that it will not appear on the screen. This can be done by blocking the receiver Rec. during only the actual time during which a pulse is being transmitted.

The vertical line 3 on the screen of Fig. 3a represents the echo signals which are received from the object being detected. Thus, the distance of the object is readily determinable by reading the index mark under line 1 at the position of line 3. There will be 240 pulses transmitted per second corresponding to a pulse for each lobe position or quadrant of the circle traversed by antenna A for sixty revolutions per second, and also 240 echo pulses corresponding to a pulse received from the object being detected during each lobe position at sixty revolutions per second. The oscilloscope screen will be scanned or swept 240 times per second. Due to the persistence of vision, the markings on the screen produced by these pulses will appear to be stationary.

Fig. 3b illustrates the appearance of the markings on the screen when an object is being detected during the condition of operation when switch S is closed (that is, with sweep displacement). The closure of switch S enables the pulse markings to be displaced on the screen and distinguished, and also their amplitudes compared. Due to the fact that two succeeding saw-tooth wave forms are displaced relative to the immediately preceding two, as indicated in Fig. 2b, the point of origin of the sweep on the screen will be correspondingly displaced. Thus, if the displaced saw-tooth wave forms appear in the up and right lobe positions, then pulses received during these up and right lobe positions will be displaced relative to pulses received during the down and left positions. The echo pulses received during the up and right lobe positions are superimposed on the screen and appear as a single vertical line 13 due to the persistence of vision. The echo pulses received during the down and left lobe positions are superimposed and appear as a single vertical line 23. The originally transmitted pulses appear on the screen as the two vertical lines 12 and 22 and may be disregarded for the purpose of the present invention.

In the operation of the invention, the switch S is left open, and the range determined as in Fig. 3a. Then the switch S is closed, and the amplitudes of the echo pulses 13 and 23 in the up and down lobe positions of Fig. 3b compared as the reed moves at a rate of one hundred and twenty times a second to cover first one mark on the screen and then the other. The marks are thus alternately covered by the reed VR, as shown in Fig. 4b. By controlling the phase shift of P' via the unicontrol shaft 119, the amplitudes of the echo pulses 13 and 23 in the right and left lobe positions are compared. When the amplitudes of the echo pulses in the up and down positions are equal or matched, as seen on the screen, and this is done by suitably orienting the antenna manually, it follows that one plane of the antenna system is pointed at the object. By controlling the phase shifter P', it is now possible to compare the echo pulses received in the right and left lobe positions. When the amplitudes of the echo pulses in the right and left lobe positions are equal or matched, as seen on the screen, it follows that the other plane of the antenna system is also pointed on the object, and under these conditions the object to be detected is in a direct line with the focus of the parabolic antenna system.

What is claimed is:

1. In an object detection system, a receiving and transmitting antenna adapted to sequentially assume different positions of effectiveness, a pulse transmitter coupled to said antenna for supplying thereto a pulse during each position of effectiveness, a cathode ray oscilloscope having a screen and two pairs of electron beam deflection elements, means coupled to said oscilloscope for rendering the electron beam in said oscilloscope effective each time said pulse transmitter produces a pulse, a receiver for receiving echo signals from the object to be detected, a connection from said receiver to said antenna, a circuit from the output of said receiver to one pair of deflection elements, a sweep circuit for producing a series of saw-tooth voltage waves, a circuit extending from the sweep circuit to the other pair of deflection elements, a circuit between said transmitter and said sweep circuit for starting the operation of said sweep circuit each time said transmitter produces a pulse, and means independent of any received signals for supplying square waves to said other pair of deflection elements for periodically displacing certain ones of said saw-tooth waves relative to the immediately preceding ones at a frequency which is a sub-multiple of the pulse frequency, whereby certain echo pulses appearing on the screen of said oscilloscope are displaced relative to others.

2. In an object detection system, an antenna adapted to sequentially assume different positions of effectiveness, a pulse transmitter coupled to said antenna for supplying thereto a pulse during each position of effectiveness, a cathode ray oscilloscope having a screen and two pairs of electron beam deflection elements, means coupled to said oscilloscope for rendering the electron beam in said oscilloscope effective each time said pulse transmitter produces a pulse, a receiver for receiving echo signals from the object to be detected, a connection from said receiver to said antenna, a circuit from the output of said receiver to one pair of deflection elements, a sweep circuit for producing a series of saw-tooth voltage waves, a circuit extending from the sweep circuit to the other pair of deflection elements, a connection from said transmitter for starting the operation of said sweep circuit each time said transmitter produces a pulse, and means including a phase shifter and a pair of electron discharge devices having their inputs coupled to said phase shifter for periodically displacing certain ones of said saw-tooth waves relative to the immediately preceding ones at a frequency which is a submultiple of the pulse frequency, whereby certain echo pulses appearing on the screen of said oscilloscope are displaced relative to others.

3. In combination, a lobe switching system comprising a directive antenna adapted to sequentially assume different lobe patterns, a pulse transmitter coupled to said antenna and adapted to transmit a pulse for each of said lobe patterns, a saw-tooth generator under control of the output of said pulse transmitter and generating saw-tooth voltage waves at the pulse frequency, a cathode ray oscilloscope having a grid normally biased to cut-off to prevent the electron beam from being visible on the screen and also provided with two pairs of electron deflecting elements, means also under control of the output of said pulse transmitter for periodically overcoming the bias on said grid at the pulse frequency to thereby render said beam visible for substantially the duration of each saw-tooth wave, a receiver having its output coupled to one pair of said deflecting elements, a circuit from said saw-tooth generator to the other pair of deflecting elements, electronic means for periodically displacing certain ones of said generated saw-tooth waves at a frequency which is a submultiple of the pulse frequency, and an optical viewing system for the screen of said oscilloscope comprising a vibrating element operating at a submultiple frequency of the pulse frequency.

4. In an object detection system, an antenna adapted to sequentially assume different positions of effectiveness, a pulse transmitter coupled to said antenna for supplying thereto a pulse during each position of effectiveness, a cathode ray oscilloscope having a screen and two pairs of electron beam deflection elements, means coupled to said oscilloscope for rendering the electron beam in said oscilloscope effective each time said pulse transmitter produces a pulse, a receiver for receiving echo signals from the object to be detected, a circuit from the output of said receiver to one pair of deflection elements, a sweep circuit for producing a series of saw-tooth voltage waves, a circuit extending from the sweep circuit to the other pair of deflection elements, and a connection from said transmitter for starting the operation of said sweep circuit each time said transmitter produces a pulse, and means for periodically displacing certain ones of said saw-tooth waves relative to the immediately preceding ones at a frequency which is a submultiple of the pulse frequency, whereby certain echo pulses appearing on the screen of said oscilloscope are displaced relative to others, and an optical viewing system for the screen of said oscilloscope comprising a vibrating element operating at a frequency which is half the pulse frequency.

5. In an object detection system, an antenna adapted to sequentially assume different positions of effectiveness, a pulse transmitter coupled to said antenna for supplying thereto a pulse during each position of effectiveness, a cathode ray oscilloscope having a screen and two pairs of electron beam deflection elements, means coupled to said oscilloscope for rendering the electron beam in said oscilloscope effective each time said pulse transmitter produces a pulse, a receiver for receiving echo signals from the object to be detected, a circuit from the output of said receiver to one pair of deflection elements, a sweep circuit for producing a series of saw-tooth voltage waves, a circuit extending from the sweep circuit to the other pair of deflection elements, and a connection from said transmitter for starting the operation of said sweep circuit each time said transmitter produces a pulse, and means for periodically displacing certain ones of said saw-tooth waves relative to the immediately preceding ones at a frequency which is a submultiple of the pulse frequency, whereby certain echo pulses appearing on the screen of said oscilloscope are displaced relative to others, and an optical viewing system for the screen of said oscilloscope comprising an objective lens gathering the light from said screen, a tuned reed having a light tab located at the image point of said objective lens, an exciting coil for operating said reed at one-half the pulse frequency, and a phase shifter in circuit with said exciting coil.

6. In an object detection system, an antenna adapted to sequentially assume different positions of effectiveness, a pulse transmitter coupled to said antenna for supplying thereto a pulse during each position of effectiveness, a cathode ray oscilloscope having a screen and two pairs of electron beam deflection elements, the screen of said oscilloscope having a fast decay and high luminosity characteristic, means coupled to said oscilloscope for rendering the electron beam in said oscilloscope effective each time said pulse transmitter produces a pulse, a receiver for receiving echo signals from the object to be detected, a circuit from the output of said receiver to one pair of deflection elements, a sweep circuit for producing a series of saw-tooth voltage waves, a circuit extending from the sweep circuit to the other pair of deflection elements, and a connection from said transmitter for starting the operation of said sweep circuit each time said transmitter produces a pulse, and means for periodically displacing certain ones of said saw-tooth waves relative to the immediately preceding ones at a frequency which is a submultiple of the pulse frequency, whereby certain echo pulses appearing on the screen of said oscilloscope are displaced relative to others, and an optical viewing system comprising a tuned vibrating element through which said screen is viewable, said vibrating element operating at a frequency which is a submultiple of the pulse frequency, and means for controlling the operation of said vibrating element to thereby prevent certain ones of said echo pulses appearing on said screen from being seen.

7. In an object detection system, a wave directive structure adapted to sequentially assume different lobe or radiation patterns, a pulse transmitter coupled to said wave directive structure for supplying thereto a pulse during each lobe pattern, a cathode ray oscilloscope having a screen and vertical and horizontal electron beam deflection structures, a receiver for receiving signals reflected from the object to be detected, a connection from said receiver to said wave directive structure, a circuit from the output of said receiver to one of said beam deflection structures, a sweep circuit for producing a series of saw-tooth voltage waves, a circuit extending from the sweep circuit to the other beam deflecting structure and operative to affect said last beam deflecting structure every time said sweep circuit produces a saw-tooth wave, a circuit between said transmitter and said sweep circuit for starting the operation of said sweep circuit each time said transmitter produces a pulse, and means supplying square waves of 50% mark to said other beam deflecting structure for periodically displacing certain ones of said saw-tooth waves relative to the immediately preceding ones at a frequency which is a sub-multiple of the pulse frequency, whereby certain reflected pulses appearing on the screen of said oscilloscope are displaced relative to others.

8. In an object detection system, a wave directive structure adapted to sequentially assume different lobe or radiation patterns, a pulse transmitter coupled to said wave directive structure for supplying thereto a pulse during each lobe pattern, a cathode ray oscilloscope having a screen and vertical and horizontal electron beam deflection structures, a receiver for receiving signals reflected from the object to be detected, a connection from said receiver to said wave directive structure, a circuit from the output of said receiver to one of said beam deflection structures, a sweep circuit for producing a series of saw-tooth voltage waves, a circuit extending from the sweep circuit to the other beam deflecting structure and operative to affect said last beam deflecting structure every time said sweep circuit produces a saw-tooth wave, a connection from said transmitter for starting the operation of said sweep circuit each time said transmitter produces a pulse, and means for periodically displacing certain ones of said saw-tooth waves relative to the immediately preceding ones at a frequency which is a sub-multiple of the pulse frequency, whereby certain reflected pulses appearing on the screen of said oscilloscope are displaced relative to others, said means including a phase shifter energized at the frequency of said saw-tooth waves and a pair of electron discharge device structures having their inputs coupled to said phase shifter in such manner as to be excited at a 180° phase relation, and connections coupling the outputs of said electron discharge device structures to the same beam deflecting structure to which the sweep circuit is connected.

9. In an object detection system, a wave directive structure adapted to sequentially assume different lobe or radiation patterns, a pulse transmitter coupled to said wave directive structure for supplying thereto a pulse during each lobe pattern, a cathode ray oscilloscope having a screen and vertical and horizontal electron beam deflection structures, a receiver for receiving signals reflected from the object to be detected, a circuit from the output of said receiver to one of said beam deflection structures, a sweep circuit for producing a series of saw-tooth voltage waves, a circuit extending from the sweep circuit to the other beam deflecting structure and operative to affect said last beam deflecting structure every time said sweep circuit produces a saw-tooth wave, a circuit between said transmitter and said sweep circuit for starting the operation of said sweep circuit each time said transmitter produces a pulse, and means coupled to the output of said sweep circuit for periodically displacing alternate pairs of said saw-tooth waves, whereby certain reflected pulses appearing on the screen of said oscilloscope are displaced relative to others, said means including elements for producing square waves of 50% mark of a predetermined polarity and for supplying said waves at such times as said output has said same polarity.

10. The combination with a cathode ray tube having a screen upon which electrical phenomena occurring at a predetermined frequency are to be viewed, of an optical viewing system comprising a tuned vibrating element in front of said screen, means for operating said element at a frequency which is a submultiple of said predetermined frequency, and means for controlling the operation of said vibrating element to thereby prevent certain ones of said receiving electrical phenomena from being viewed.

11. The combination with a cathode ray tube having a screen upon which electrical pulses recurring at a predetermined frequency are to be viewed, of an optical viewing system comprising an objective lens in front of said screen and gathering the light from said screen, a tuned reed located on the side of said lens away from said screen and having a light tab located at the image point of said lens, an exciting coil coupled to said reed, and means for energizing said coil with periodically repeating waves for operating said reed at a sub-multiple of said predetermined frequency.

WILLIAM A. MILLER.

REFERENCES CITED

The following references are of record in the file of this patent:

UNITED STATES PATENTS

| Number | Name | Date |
|---|---|---|
| 2,189,549 | Hershberger | Feb. 6, 1940 |
| 2,312,203 | Wallace | Feb. 23, 1943 |
| 2,408,050 | De Rosa | Sept. 24, 1946 |
| 2,426,979 | Ayers | Sept. 9, 1947 |

FOREIGN PATENTS

| Number | Country | Date |
|---|---|---|
| 552,072 | Great Britain | Mar. 22, 1943 |